United States Patent [19]

Fallon

[11] Patent Number: 4,913,184

[45] Date of Patent: Apr. 3, 1990

[54] FLOW CONTROL DEVICE

[76] Inventor: Merton R. Fallon, 21730 MaryLee St. #33, Woodland Hills, Calif. 91367

[21] Appl. No.: 401,183

[22] Filed: Aug. 31, 1989

[51] Int. Cl.$^4$ ............................................. F16K 17/14
[52] U.S. Cl. ...................................... 137/71; 137/68.1
[58] Field of Search ............... 137/68.1, 71; 220/89 A

[56] References Cited

U.S. PATENT DOCUMENTS

| | | | |
|---|---|---|---|
| 2,163,401 | 6/1939 | Loudenbeck | 137/68.1 |
| 4,219,040 | 8/1980 | Fallon et al. | 137/68.1 |
| 4,566,476 | 1/1986 | Fallon et al. | 137/71 |

*Primary Examiner*—John Rivell
*Attorney, Agent, or Firm*—James E. Brunton

[57] ABSTRACT

A safety flow control device in a beverage distribution system using pressurized gas to dispense the beverage from its containers for ensuring that the containers are not accidentally overpressurized. The device is adapted to be placed in the line which connects the pressure source to the container for the beverage. The device includes a base assembly having an internal chamber in communication with a fluid inlet and a fluid outlet and a replacement unit removably connected with the base assembly. The replacement unit embodies a rupture disc having a first side exposed to the gas used in pressurizing the containers and a second side exposed at atmosphere. Strategically positioned between the pressure inlet of the device and the pressure side of the rupture disc is a valving mechanism which is maintained in an open configuration by the rupture disc. In the open configuration the valving mechanism permits the gas to flow from the inlet into a first sub-chamber defined by the first side of the rupture disc and then outwardly through the outlet of the device. When the rupture disc fails, the valve mechanism will automatically close preventing further flow of gas into the first sub-chamber and toward the outlet. The replacement unit is constructed as at unit of the factory so that, when the rupture disc fails, the entire unit containing the failed disc can be disassembled from the base assembly and replaced with a factory built replacement unit having a new rupture disc correctly positioned therewithin.

5 Claims, 2 Drawing Sheets

FLOW CONTROL DEVICE

FIELD OF THE INVENTION

The present invention relates generally to fluid flow control devices. More particularly, the invention concerns an improved safety device for use in beverage distribution systems which positively prevents over pressurization of the beverage containers forming a part of the distribution systems.

DISCUSSION OF THE PRIOR ART

Introduction

In beverage distribution systems and particularly those used for beer, a pressure source is usually connected to a manifolding subsystem which is, in turn, connected to one or more kegs of beer through a tapping mechanism. The tapping mechanism permits the dispensing of beer from the keg under the pressure provided from the source. Safety devices have been employed in beverage installations of this kind to control the amount of pressure delivered to the keg. Otherwise, should a failure occur somewhere upstream of the keg tapping mechanism, the keg itself may become over pressurized to such an extent that it could very well explode or at least blow portions of the keg tapping mechanism with such force as to cause catastrophic consequences to those in the area of the keg. Safety devices used for this purpose have typically been mechanically adjustable and employed moving mechanical devices which are subject to frequent failure and blockage.

For adjustable safety devices, the most common technique has been the use of a spring bias release valve with various adjusting devices. There have also been attempts to incorporate safety relief valves in the pressure reducing regulator to control pressure delivered from the source. Unfortunately, the use of these adjustable regulators allow even a well-intentioned operator to adjust the regulator in a manner which cancels the effect of any safety mechanism. For example, when the operator hears the hissing noise that occurs when gas pressure begins being vented from the safety relief valve, and, knowing that this involves a gas leakage, he may adjust the safety relief valve to stop the leakage. In doing so, the relief valve may be bottomed out completely invalidating its existence or use.

Other prior art approaches to the problem have included the installation of safety relief valves in the beverage container itself. This has not proved to be completely satisfactory. By installing the relief valve inside the beverage container, it is continually exposed to the beverage product being dispensed from that container. As these products are by their very nature sticky, they adversely affect the predictability of the valves with which the beverage comes in contact. In other words, as the sticky beverage material permeates the interstices of the valve mechanism, elements of the mechanism may become adhered to one another to such an extent that it would not work properly, if at all.

With regard to the spring bias relief valve system generally used in the connection apparatus, they are also subject to the major disadvantage of their constant exposure to the beverage itself. As mentioned above, the beverage is sticky and as it dries, it forms a reasonably effective glue which causes the lifting or actuating pressure of the valve itself to vary widely. Because of this variation, the spring bias release system is one which is found to be unreliable and unsafe.

Another major disadvantage is that these safety valves are normally incorporated into some other component element of the dispensing system. They are usually employed with the coupler body of the coupler device which is used to interconnect the beverage container with the dispensing hoses and faucets. Because of the limitations in space and costs imposed on these systems, it is necessary that the safety system also be sufficiently small to work within the coupler. As a result of this size limitation, the safety valves may not provide an adequately large orifice through which to expel the excessive gases being applied from an over pressured or malfunctioned gas pressure regulator.

The pressure systems used with beverage distribution systems may require a source gas pressure of up to 1000 pounds per square inch. This, of course, varies substantially with temperature, but the normal pressure involved is usually around 800 pounds per square inch. If the reducing regulator on the gas cylinder should fail, allowing full bottle or source pressure to flow into the gas pressure feedline, the gas will achieve flow rates of on the order of 60 to 100 cubic feet per minute. The size of the expulsion orifice in the existing safety relief valves are so small that they will not achieve the same flow rate at the same source pressure. More importantly, the upper safe limit of the keg pressure, which is much lower than the source pressure, will achieve a limited flow rate of only 17 to 21 standard cubic feet per minute. In other words, if they are not glued shut by the beverage residue and they lift at the proper pressure, they will not provide sufficient flow rate to safely vent the system. Their proper actuation merely delays the explosive rupture of the beverage container some fraction of a second or perhaps two seconds at the most, depending on whether the container is completely filled or particularly filled with the beverage at the time of failure.

Because the beverage containers are placed within coolers and other storage places, there is also always the possibilitY of a blockage of the safety valve. In fact, in some coolers, the six packs of beverage cans or bottles, packages of meat, vegetables and other products are frequently refrigerated in restaurant environments and placed on or adjacent these valve mechanisms in such a way that they block or prevent their actuation.

One of the most effective devices ever devised to solve the prior art problems set forth herein is the device disclosed in U.S. Pat. No. 4,219,040, which issued to the inventor of the present invention. A significant improvement over the device of U.S. Pat. No. 4,219,040, is disclosed in U.S. Pat. No. 4,566,476. The device of this latter patent uniquely prevents the undesirable venting of the gas to atmosphere by means of a novel safety control valve which has been incorporated into the design of the unit.

In beverage dispensing systems, carbon dioxide and nitrogen are frequently used as the pressurizing sources gases. With the device of U.S. Pat. No. 4,219,040, over pressurization of the system will cause the rupture disc of the device to fail satisfactorily preventing over pressurization of the beverage containers, but permitting the source gas to flow to atmosphere. In such a case, flow will continue until the gas source is depleted. Where gas generators or large volume pressure tanks are used, either singly or in series, to supply the source gas, substantial quantities of gas can be lost if the failure of the burst disc is not promptly discovered. The dumping of large volumes of gas can itself create a significant safety hazard. For example, when CO2 is used as the source gas, and the system is installed in a relatively small room, risks of asphyxiation or hypoxia become substantial. Even in larger rooms, since CO2 will sink to the floor, if a workman should fall and remain on the floor for any length of time, hypoxia can result causing death or serious injury to the workman. Additionally, where the safety device of U.S. Pat. No. 4,219,040 is incorporated into systems using other, more toxic source gases, dumping of the source gas to atmosphere can be even more catastrophic unless regular monitoring of the system takes place.

The device of U.S. Pat. No. 4,566,476 uniquely overcomes all of the drawbacks of the prior art safety devices by providing a device which, not only prevents over pressurization of the beverage container, but also prevents dumping of the source gas to atmosphere in the event of over pressurization of the system.

When the rupture disc of the device of U.S. Pat. No. 4,566,476 fails it, of course, must be replaced by a new disc prior to resuming operations. Experience with this device has shown that the basic construction of the device, and particularly the manner in which the rupture disc is mounted within the device, does not lend itself to easy and foolproof replacement of the failed rupture disc in the field. When disc replacement is attempted by an unskilled person or persons not familiar with the design of the device, the disc can easily be damaged or improperly installed thereby causing the device to malfunction. It is this problem that is addressed by the present invention.

To replace the rupture disc of the device of U.S. Pat. No. 4,566,476, the cap, or closure member, must be carefully removed from the housing or base. Next, the sub-body and the ruptured disc must be removed taking care not to damage the O-ring which provides a seal between the sub-body and the housing. To reassemble the unit, a new rupture disc must be carefully and precisely installed with the upper surface of the valve member in engagement with the underside of the disc in the manner shown in FIG. 3.

Since the rupture disc is extremely fragile in an unsupported condition, great care must be taken in reassembling it within the device. If the disc is damaged, the device could, of course, be rendered inoperable.

The present invention solves the problems discussed in the preceding paragraphs by providing a device of a novel construction in which the rupture disc is mounted within a factory assembled unit which can be interconnected with the housing as a complete unit. With this novel design, when the disc is ruptured, the failed disc remains a part of the factory assembled unit which can be easily removed from the housing as a unit. A new factory assembled unit containing a new rupture disc can then readily be assembled with the housing without the necessity of even touching the fragile, rupture disc. The design of the replacement unit is such that the frangible disc is always correctly positioned with respect to the valve member of the device, thereby eliminating the assembly errors possible with the prior art device.

SUMMARY OF THE INVENTION

The present invention generally relates to an improved safety flow control device for use in a beverage distribution system for ensuring that the containers of pressurized beverage are not over pressurized. More specifically, the device is placed in the line which connects the pressure source to the containers of the beverage. The device embodies a rupture disc embodied within a replacement unit which is assembled at the factory. When this unit is assembled with the housing of the device, the rupture, or frangible, disc has a first side exposed to the gas used in pressurizing the containers and a second side exposed to atmosphere. The rupture disc is housed within the replacement unit in such a way that it is substantially tamperproof ensuring that the rupture disc still not be inadvertently broken until the pressure on the pressure side of the disc has reached an unacceptable level.

Disposed between the pressure inlet of the device and the first, or pressure, side of the rupture disc is a valving mechanism which is maintained in an open configuration by the rupture disc. In the open condition the valving mechanism permits the gas to flow from the inlet into a first sub-chamber defined by the first side of the rupture disc and then outwardly through the outlet of the device. When the rupture disc fails, the valve mechanism will automatically close preventing further flow of gas into the first sub-chamber and toward the outlet. The valve is constructed so that it will remain closed until pressure on the inlet side of the unit is relieved. Following failure of the rupture disc, the factory assembled, disc supporting unit is disconnected from the housing of the device and a new unit embodying an undamaged rupture disc is substituted therefor.

A particular object of the present invention is to provide a safety flow control device of the character described in which, the rupture disc is factory mounted within a replacement unit which can easily be disconnected from the base of the device when the rupture disc fails and can be easily replaced by a new factory assembled unit containing an undamaged disc.

It is yet another object of the invention to provide a safety flow control device which is both tamper proof and highly reliable and also one which can be inexpensively produced and easily and quickly installed by unskilled workmen.

It is still a further object of the invention to provide a safety device which, when actuated cannot be corrected in any other way than by depressurization of the system and total replacement of the replacement unit embodying the rupture disc portion of the device.

DISCUSSION OF ONE FORM OF THE INVENTION

Figure 1:
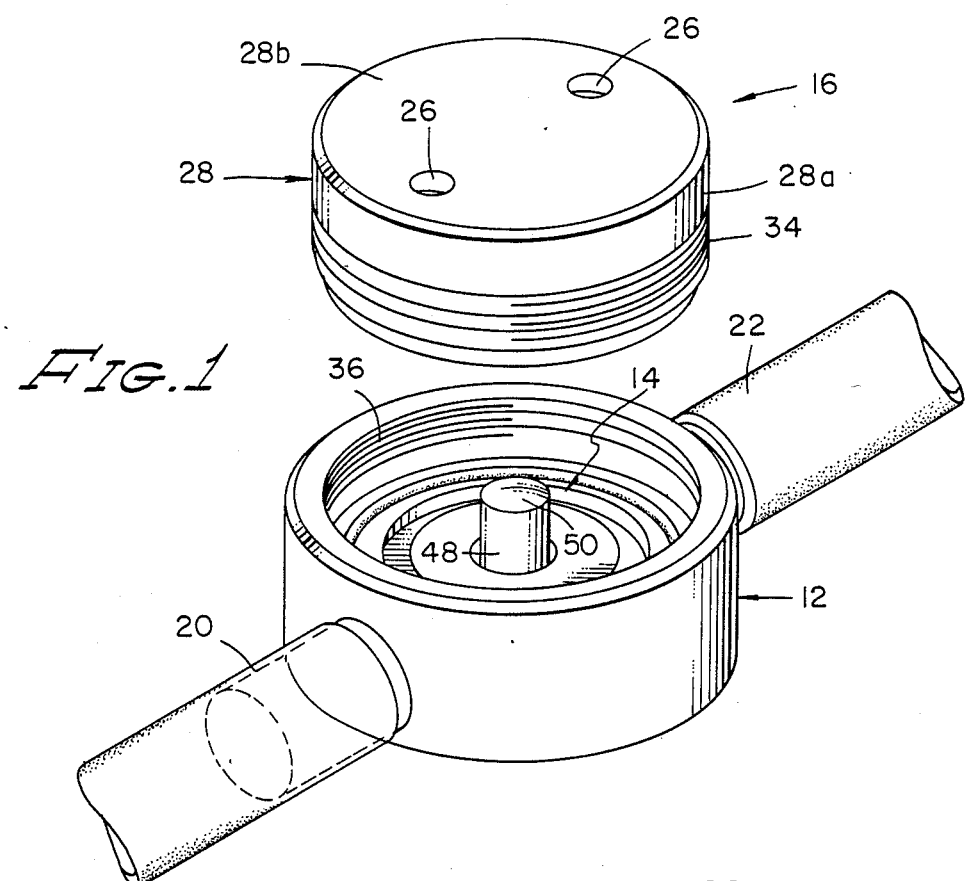
FIG. 1 is a perspective, exploded view of the improved flow control device of the present invention showing the factory assembled unit carrying the rupture disc separated from the hosing of the device. The housing of the device has an inlet conduit adapted to be connected to the manifolding apparatus of the beverage distribution system and an outlet conduit adapted to be connected with a beverage container such as a beer keg.
Figure 2:
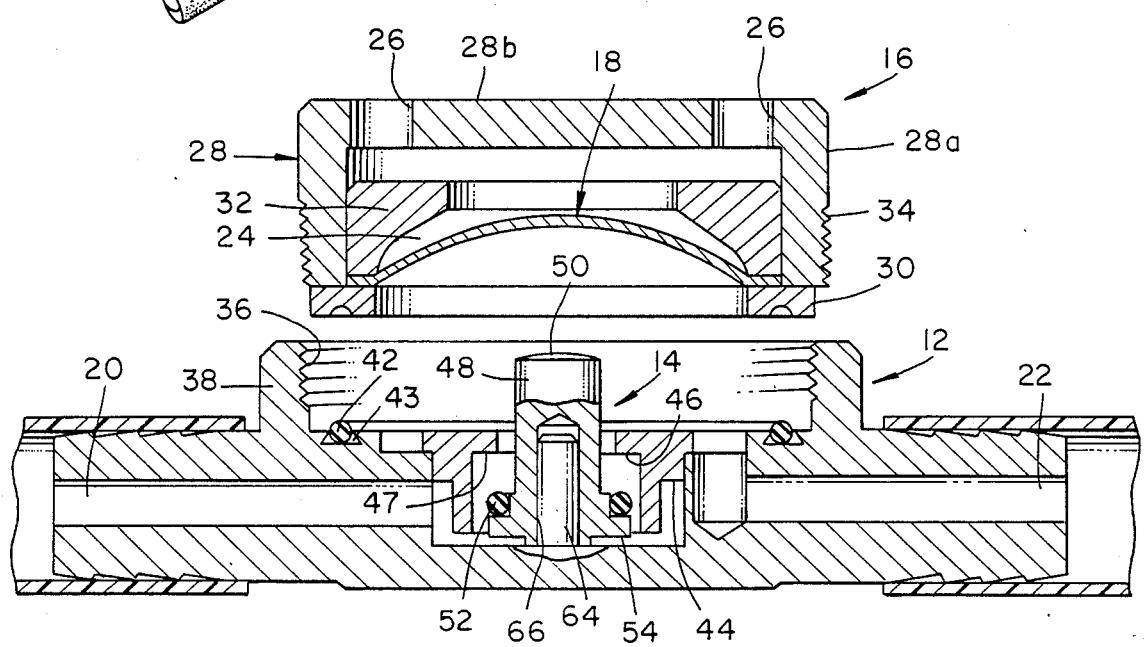
FIG. 2 is a side elevational, cross sectional exploded view of the flow control device of the invention, showing the replacement unit containing the rupture disc of the device separated from the housing of the device which also contains the valving mechanism.

Referring to the drawings, and particularly to FIGS. 1 and 2, the improved flow control device of the present invention comprises a housing, or base assembly 12, which includes a valving assembly 14, and a replacement unit 16 within which is mounted to a rupture disc 18. The device of the invention is adapted to be disposed between a beverage container, such as a beer keg (not shown) and a gas pressure system (not shown) that normally includes a source of gas at elevated pressure which is interconnected with a manifolding subsystem. Such an arrangement is discussed in U.S. Pat. No. 4,566,476 and is illustrated in FIG. 1 of that patent. As discussed in U.S. Pat. No. 4,566,476, when the system is used for dispensing beer, the gas source is typically carbon dioxide which may be at a pressure of up to 1,000 pounds per square inch. Other gases such as nitrogen may also be used for other applications. The manifolding subsystem used with the apparatus of the present invention is typically constructed of a heavy walled metal and is, in itself, usually capable of withstanding source gas pressures of at least 1,000 pounds per square inch. Accordingly, if a regulator were to fail, the manifolding subsystem would typically be able to accommodate the source gas at full pressure without the risk of catastrophic failure.

As previously mentioned, the flow control device of the present invention includes an inlet conduit 20 which is connected with the pressure system and an outlet conduit 22 which is connected with the keg. The device of the invention functions to prevent catastrophic over pressurization of the beverage container in the event of failure or misuse of a pressure regulator contained within the gas pressure system.

Figure 3:
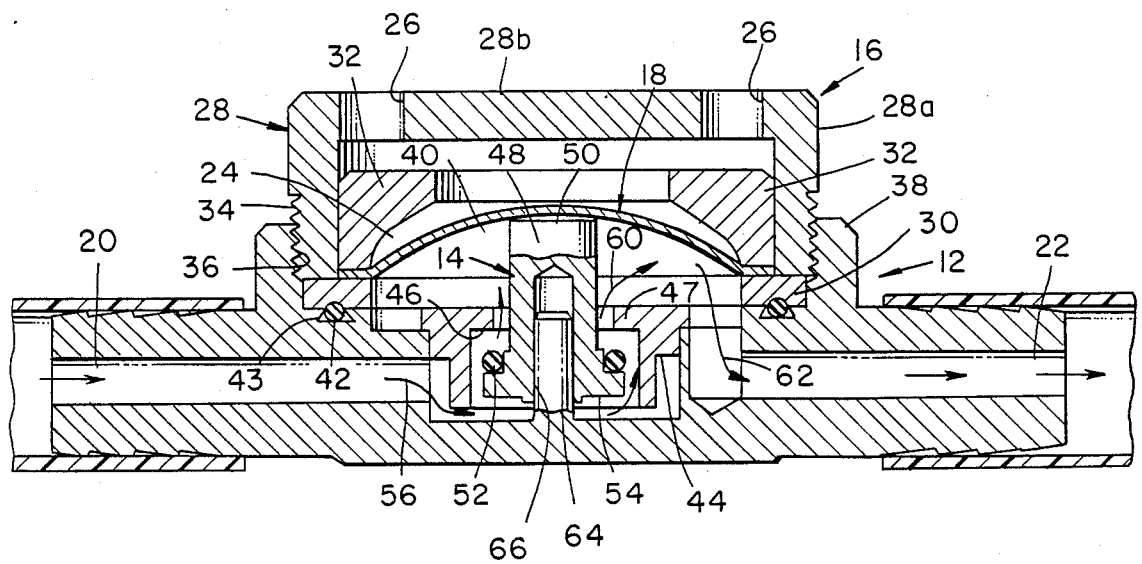
FIG. 3 is a side elevational, cross sectional view similar to FIG. 2, but showing the device in an assembled configuration with the valve member in engagement with the inner surface of the rupture disc.
Figure 5:
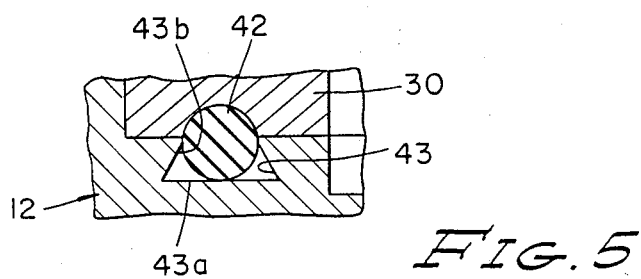
FIG. 5 is a fragmentary cross-sectional view illustrating the arrangement for sealing the base ring of the device with respect to the base assembly.

Turning now to FIGS. 2 and 3, the replacement unit 16 of the flow control device of the instant form of the invention includes a vent chamber 24 which is in communication with the atmosphere through a plurality of apertures 26 provided in a cup shaped cover member, or closure cap, 28 having a skirt portion 28a and a top wall 28b. Rupture disc is disposed between a base ring 30 which is connected to skirt 28a and a sub body 32 mounted interiorly of the skirt portion of cap 28. Sub body 32 and base ring 30 are sealably interconnected with cap 28 at the factory by any suitable means such as sonic welding or adhesive bonding. Disc 18 is also sealably interconnected with subbody 32 by any suitable means such as sonic welding, adhesive bonding, or the like. The outer surface of skirt 28a is provided with threads 34 so that the replacement unit 16 can be threadably mated with internal threads 36 provided on an upstanding collar 38 which forms a part of base assembly 12. When the replacement unit is mated with the base housing 12, as shown in FIG. 3, an internal chamber, 40 is formed, which chamber is in communication with inlet 20 and outlet 22. Rupture disc 18 is precisely constructed of a thin metal, or other durable material, and is specifically designed to fail or rupture when a predetermined excessive pressure is reached within pressure chamber 40. An elastomeric "O" ring 42 is disposed within a specially configured groove 43 to seal base ring 30 relative to base assembly 12 (See FIG. 5).

The previously mentioned valving assembly, or valve means, 14 is mounted within base assembly 12 in cooperative association with rupture disc 18. The valve means functions to block the flow of fluid from inlet 20 into pressure chamber 40 when the rupture disc fails and the valve means closes. In the present form of the invention, the valve means comprises a generally cylindrically shaped valve body 44 having a circular shaped seat 46 defined by an inturned flange 47. As indicated in FIG. 3 seat 46 is disposed within chamber 40 intermediate inlet 20 and outlet 22. also forming a part of the valve means of this embodiment of the invention is a generally cylindrically shaped valve member 48 which is provided with a seat engaging portion adapted to sealably engage the valve seat 46. Valve member 48 also has a spaced apart dome shaped surface 50 which is normally disposed in engagement with the pressure side of the rupture disc 18 (the lower side of the disc as viewed in FIG. 3). In the form of the invention illustrated in the drawings, the seat engaging portion includes an elastomeric O-ring 52 which is adapted to sealably engage the valve seat 46 when the valve member 48 is moved into the sealing position in a manner presently to be described.

At the opposite extremity of the valve member 48 from surface 50 is a pressure, or first, surface 54 which can be acted upon by fluid pressure entering the device through inlet 20. The fluid under pressure entering inlet 20 follows the path of the arrows 56 in FIG. 3 into the area of pressure surface 54. Fluid pressure acting on surface 54 tends to move the valve member 48 from a first position wherein the valve means is closed. A unique aspect of the device of the invention resides in the fact that the rupture disc 18 is so constructed and arranged as to block movement of the valve member 48 to the second or closed position so long as the rupture disc 18 remains intact and unruptured. This normal position of the valve member 48 and the unruptured frangible membrane 18 is illustrated in FIG. 3.

With the various complements of the device in the position shown in FIG. 3, fluid under pressure can enter the device through inlet 20 pass into the valve means, as indicated by the arrow 56, and pass upwardly into the pressure chamber 40 along the path indicated by the arrow 60 of FIG. 3. So long as the fluid under pressure entering the pressure chamber remains below a predetermined level, that is a pressure less than that required to rupture the rupture disc, the fluid will continue to flow into the outlet 30 of the unit along the path indicated by the arrow 62 in FIG. 3. Under this condition, and so long as the fluid pressure within pressure chamber 40 remains below a predetermined level, the valve means will be maintained in an open position because first surface 50 of valve member 48 will engage disc 18 and will be prevented from further movement toward the second closed position of the valve.

Figure 4:
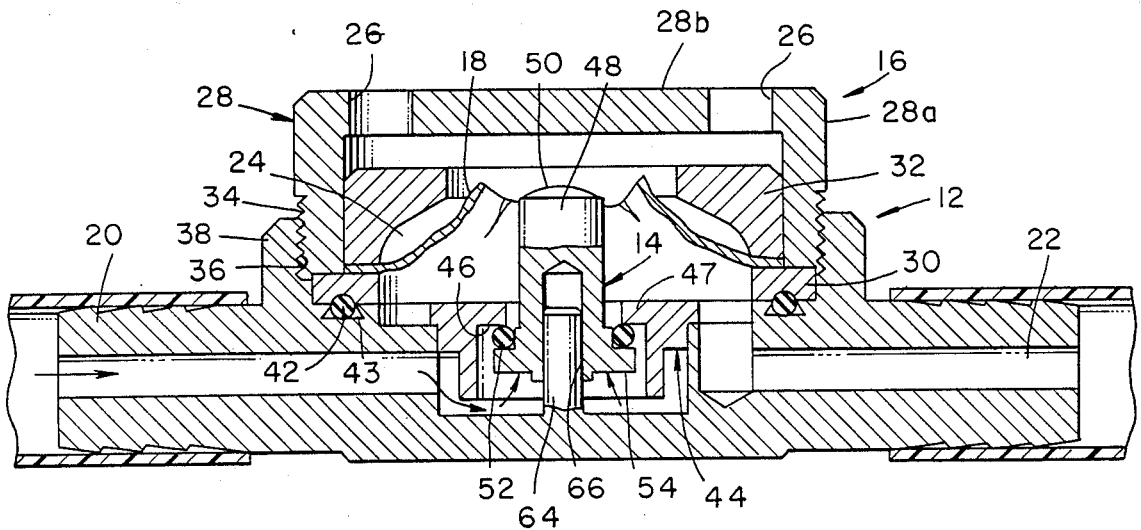
FIG. 4 is a side elevational cross sectional view similar to FIG. 3, but showing appearance of the component parts of the device after the rupture disc has been ruptured as a result of excessive pressure condition in the line leading to the manifolding system.

Turning now to FIG. 4, there is illustrated the position of the various component parts of the device of the invention after the occurrence of an overpressurization of the pressure chamber 40 sufficient to cause the rupture disc 18 to rupture. As depicted in FIG. 4, when the rupture disc 18 ruptures the fluid pressure acting upon the first, or pressure, surface 54 of the valve member 48 will cause the valve member to be urged toward the second closed position shown in FIG. 4. In this position, the elastomeric O-ring 52 has moved into sealing engagement with valve seat 46, thereby preventing further flow of fluid from the inlet 20 through the valve means into the pressure chamber 40.

A study of FIG. 4 will show that, upon rupturing of the frangible disc 18, the fluid under pressure which is flowing through he device will flow from the pressure chamber 40 to atmosphere through apertures 26 in closure cap 28. This flow will continue for a brief moment until the valve means closes into the position shown in FIG. 4. At this point all further flow of fluid into the pressure chamber will be blocked by the valve means. It is apparent that any fluid under pressure downstream of the valve means will also be permitted to freely flow to atmosphere through the ruptured disc and outwardly through apertures 26 provided in cap 28.

In the embodiment of the invention shown in the drawings, the valve body, the valve member, and the valve seat are generally circular in cross section at any point. Functioning to guide movement of the valve member 48 from the first closed portion to the second open position is a centrally disposed, cylindrically shaped guide column 64 which comprises apart of housing assembly 12. As indicated in FIGS. 3 and 4, valve member 48 is provided with a counter bore 66 which is of a diameter to closely telescopically receive guide column 64.

Upon failure of the rupture disc 18 and the movement of the valve into the closed position shown in FIG. 4, the valve will remain in a close position due to the urging of fluid under pressure acting on surface 54 and therefore will prevent all further flow of fluid into pressure chamber 32 or to atmosphere through apertures 26.

Referring again to FIGS. 1 and 2, it can be seen that if the rupture disc 18 of the device should fail, the replacement unit 16, including the ruptured disc, can easily be threadably disconnected from base assembly 12. unit 16 can then be discarded and a fresh replacement unit having a new rupture disc can be threadably interconnected with base assembly 12. During assembly of the replacement unit with the base assembly, "O" ring 42 will be precisely compressed within groove 43 which includes a base 43a that is wider than the top opening 43b. This groove configuration prevents damage to the "O" ring and permits the "O" ring to be controllably compressed so that the valve means is always correctly positioned with respect to rupture disc 18.

The housing, the valve seat, the valve member, the sub body 32 and the cap 28 can be constructed of plastic, metal or other suitable materials. The guide column 64 can be integrally formed with the housing or it can be separate component interconnected with the housing. The frangible membrane can be formed of thin metal or their suitable material.

Having now described the invention in detail in accordance with the requirements of the patent statues, those skilled in this art will have no difficulty in making changes and modifications in the individual parts or their relative assembly in order to meet specific reuirements or conditions. Such changes and modifications may be made without departing from the scope and spirit of the invention, as set forth in the following claims.

I claim:

1. A flow control device for interconnection between a source of pressurized fluid and a container to be pressurized, comprising:
   (a) a base assembly having an inlet adapted to communicate with the source of pressurized fluid and an outlet adapted to communicate with the container, said housing having an internal chamber in communication with said inlet and said outlet;
   (b) a replacement unit adapted to be removably connected to said base assembly, said replacement unit comprising:
       (i) a generally cup shaped cap having a skirt portion and a top wall, said top wall having a plurality of apertures therethrough;
       (ii) a sub-body connected to said cap internally of said skirt portion;
       (iii) a ring shaped base connected to said skirt portion of said cup; and
       (iv) a rupture disc disposed intermediate said sub-body and said ring shaped base, said rupture disc being adapted to fail when a predetermined pressure is reached within said internal chamber of said base assembly; and
   (c) valve means disposed in said base assembly in cooperative association with said rupture disc for blocking the flow of fluid from said inlet into said internal chamber when said rupture disc fails.

2. A flow control device as defined in claim 1 in which said valve means comprises:
   a valve seat disposed within said base assembly intermediate said inlet and said outlet; and
   (b) a valve member operably associated with said valve seat and said rupture disc, said valve member being movable by fluid pressure from a first position wherein said valve member is spaced from said valve seat to a second position wherein said valve member is in sealable engagement with said valve seat, said rupture disc being positioned within said replacement unit so as to block movement of said valve member to said second position when said replacement unit is interconnected with said base assembly.

3. A flow control device as defined in claim 2 in which said replacement unit is threadably interconnected with said base assembly.

4. A flow control device as defined in claim 3 in which said plurality of apertures are located about the perimeter thereof.

5. A flow control device as defined in claim 4 in which said sub-body is disposed between said rupture disc and said apertures in a manner such that a tortuous path is formed between said rupture disc and said apertures.

* * * * *